United States Patent
Kanbe et al.

(10) Patent No.: US 7,338,725 B2
(45) Date of Patent: *Mar. 4, 2008

(54) MAGNETIC RECORDING MEDIUM AND MAGNETIC STORAGE DEVICE

(75) Inventors: Tetsuya Kanbe, Tokyo (JP); Yotsuo Yahisa, Tokyo (JP); Hiroyuki Suzuki, Tokyo (JP); Hidekazu Kashiwase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 406 days.

This patent is subject to a terminal disclaimer.

(21) Appl. No.: 11/072,042

(22) Filed: Mar. 3, 2005

(65) Prior Publication Data

US 2005/0164037 A1    Jul. 28, 2005

Related U.S. Application Data

(63) Continuation of application No. 10/306,361, filed on Nov. 27, 2002, now Pat. No. 6,887,565.

(30) Foreign Application Priority Data

Nov. 28, 2001  (JP) ............................ 2001-361909

(51) Int. Cl.
  *G11B 5/66* (2006.01)
  *G11B 5/70* (2006.01)

(52) U.S. Cl. .................................. 428/832.2
(58) Field of Classification Search ........... 428/832.2
  See application file for complete search history.

(56) References Cited

U.S. PATENT DOCUMENTS

| 6,383,668 B1 | 5/2002 | Fullerton et al. |
| 6,403,240 B1 | 6/2002 | Kanbe et al. |

(Continued)

FOREIGN PATENT DOCUMENTS

JP    2001-19572 A    1/2001

(Continued)

OTHER PUBLICATIONS

Abarra et al. "Longitudinal Magnetic Recording Media with Thermal Stabilization Layers," Applied Physics Letters 77(16):2581-3 (Oct. 2000).

(Continued)

*Primary Examiner*—Holly Rickman
(74) *Attorney, Agent, or Firm*—Townsend and Townsend and Crew LLP

(57) ABSTRACT

An inplane magnetic recording medium having high S/N and thermal stability and a reliable magnetic storage device having surface recording density of 50 megabit/mm$^2$ or more is described. The magnetic recording medium includes magnetic layers formed on a nonmagnetic substrate with a plurality of ground layers therebetween, at least one of the ground layers formed from an alloy of a body-centered cubic structure containing Cr as a main component and B of from 2 atomic % to 12 atomic %. Main components of the magnetic layers include a lower magnetic layer containing Co and Cr of from 10 atomic % to 16 atomic %, with film thickness of from 1.5 nm to 4.5 nm, and an upper magnetic layer containing Co, coupling anti-ferromagnetically with the lower magnetic layer through nonmagnetic intermediate layers.

5 Claims, 8 Drawing Sheets

U.S. PATENT DOCUMENTS

| | | |
|---|---|---|
| 6,537,684 B1 | 3/2003 | Doerner et al. |
| 6,602,612 B2 | 8/2003 | Abarra et al. |
| 6,645,614 B1 | 11/2003 | Girt et al. |
| 6,759,138 B2 | 7/2004 | Tomiyasu et al. |
| 6,761,982 B2 | 7/2004 | Sakawaki et al. |
| 6,770,386 B1 | 8/2004 | Hara et al. |
| 6,830,837 B2 | 12/2004 | Kanbe et al. |
| 6,887,565 B2 * | 5/2005 | Kanbe et al. ............... 428/336 |
| 6,926,977 B2 | 8/2005 | Osawa et al. |
| 2002/0098389 A1 | 7/2002 | Wang et al. |
| 2002/0098390 A1 | 7/2002 | Do et al. |
| 2002/0132140 A1 | 9/2002 | Igarashi et al. |

FOREIGN PATENT DOCUMENTS

| | | |
|---|---|---|
| JP | 2001-195721 A | 7/2001 |
| JP | 2001-229527 A | 8/2001 |
| JP | 2001-274018 A | 10/2001 |

OTHER PUBLICATIONS

Fullerton et al. "Antiferromagnetically Coupled Magnetic Media Layers for Thermally Stable High-Density Recording," Applied Physics Letters 77(23):3806-8 (Dec. 2000).

* cited by examiner

Substrate conveying direction

MAGNETIC RECORDING MEDIUM AND MAGNETIC STORAGE DEVICE

CROSS-REFERENCES TO RELATED APPLICATIONS

This application is a Continuation Application of U.S. patent application Ser. No. 10/306,361, filed Nov. 27, 2002 now U.S. Pat. No. 6,887,565 and titled "Magnetic Recording Medium and Magnetic Storage Device," which claims priority from Japanese Patent Application Reference No. 2001-361909, filed Nov. 28, 2001, each of which is incorporated herein by reference for all purposes.

BACKGROUND OF THE INVENTION

1. Field of the Invention

This invention relates to a magnetic disk which can be used in a highly reliable magnetic storage device capable of recording/reproducing information of high density, and a magnetic storage device that uses the recording medium of the invention.

The demand for making high density recording media has grown as magnetic storage devices have increased in mass storage. To meet the demand, noise reduction in the media is required. For reduction in noise, it is effective to reduce the grain size of magnetic layers and to decrease Br·t, which is a product of residual magnetic flux density (Br) and the film thickness of magnetic layers (t).

In the former case, however, decrease in volume of magnetic grains gives rise to degradation of thermal stability factors (Ku·v/kT) (Ku: constant of crystalline magnetic anisotropy, v: volume of magnetic crystal grains, k: Boltzmann's constant, T: absolute temperature), which give an index for thermal stability. Thus, suppression is made possible to some degree by enhancing Ku but enhancement of Ku is limitative since the overwriting characteristic is rapidly degraded when the writing capacity of a recording head is exceeded. As for the case where Br·t is decreased, Ku·v/kT is decreases with reduction in film thickness, so thermal stability is decreased. As described above, degradation in thermal stability becomes an obstacle to reduction in noise.

Antiferromagnetically coupled media, a technique that is compatible both for improvement of thermal stability and for noise reduction, (Apple. Phys. Lett., vol. 77, pp. 2581-2583, October (2000), appl. Phys. Lett., vol. 77, pp. 3806-3808, December (2000)), has been proposed in recent years. According to this technique, magnetic layers are formed in a double-layered structure, in which antiferromagnetic coupling is made through Ru intermediate layers. In antiferromagnetically coupled media, magnetization of lower magnetic layers on a side of a substrate and magnetization of upper magnetic layers on a side of a protective film are antiparallel in a state of residual magnetization.

Therefore, Br·t of an antiferromagnetically coupled medium is generally represented by Br·t=Br2·t2−Br1·t1 with the use of Br·t (Br2·t2) of upper magnetic layers and Br·t (Br1·t1) of lower magnetic layers. Accordingly, Br·t can be set low while magnetic layers are maintained at a thick film thickness, as compared to a medium composed of magnetic monolayers.

As described above, antiferromagnetically coupled media afford reduction in noise to some degree, but reduction in Br·t alone provides insufficient noise reduction and inplane magnetic recording density of 50 megabits/mm2 or more cannot be attained. In addition, there is not yet enough knowledge with respect to such factors as layer configuration, magnetic characteristics of Co alloy materials used for magnetic layers, and so on have on recording/reproducing characteristics, so that the structure has not yet been made optimal in realizing reduction in noise.

BRIEF SUMMARY OF THE INVENTION

This invention provides an inplane magnetic recording medium having a high medium signal-to-noise ratio (S/N), sufficient stability for thermal fluctuation, and a highly reliable magnetic storage device having a surface recording density of 50 megabit/mm$^2$ or more, attributable to combination with a magnetic head of high sensitivity and optimization of recording/reproducing conditions. These benefits are attained by the use of an inplane magnetic recording medium comprising magnetic layers formed on a nonmagnetic substrate with a plurality of underlayers therebetween. At least one of the underlayers includes an alloy having a body-centered cubic structure containing Cr as a main component, B of from 2 atomic % to 12 atomic %, the magnetic layers comprising a lower magnetic layer containing Co as a main component and Cr of from 10 atomic % to 16 atomic % and having a film thickness of from 1.5 nm to 4.5 nm, and an upper magnetic layer containing Co, which effects anti-ferromagnetic coupling with the lower magnetic layer through nonmagnetic intermediate layer as a main component.

The inventors of the present application have conducted investigation of various Co alloy materials for a lower magnetic layer and found that a medium S/N exhibits a strong dependency on a film thickness (t1) of the lower magnetic layer with a Cr content of at least 10 atomic % and at most 16 atomic %. When the medium S/N reaches maximum, t1 is in the range of from 1.5 nm to 4.5 nm although it is somewhat different depending upon the composition of a material (mainly the concentration of Cr) in the lower magnetic layer and the material of the upper magnetic layer. Therefore, a medium having a high S/N can be obtained by optimizing t1 in the above range.

The lower magnetic layers are not specifically limitative provided that they are made up of an alloy material of a hexagonal close-packed structure containing Co as a main components Cr of from 10 atomic % to 16 atomic %, and other elements such as B, Pt, Ta, Ru, Re, which may be added thereto. Noise of a medium can be further reduced by addition of B, but at most 10 atomic % is desirable since excessive addition thereof degrades crystallinity. Addition of Pt improves thermal stability, but at most 10 atomic % is preferable since such addition causes degradation in overwriting characteristic.

Since an effect of the invention is not dependent upon crystalline orientation, it is applicable to a medium, in which magnetic layers are oriented (referred to below as "(11.0) orientation") with an (11.0) plane thereof substantially in parallel to a surface of a substrate and also to a medium with a (10.0) orientation. The former orientation is obtained by forming an amorphous alloy such as CoCrZr alloy, NiTa alloy as a first underlayer (seed layer), and forming a magnetic layer on the seed layer through an alloy of a body-centered cubic structure containing Cr as a main component and B of from 2 atomic % to 12 atomic %. The latter orientation is obtained by using seed layers of a B2 structure such as NiAl alloy. Similar effects are obtained in media, in which crystalline grains with other orientations are intermixed and no specific preferential orientation exhibits itself.

A second underlayer is not limitative provided that an alloy of a body-centered cubic structure containing Cr as a main component and B of from 2 atomic % to 12 atomic % is used. To obtain a medium of low noise, however, it is desirable to use a Cr—Ti—B alloy capable of reducing grain size. When the lower magnetic layers contain B, Ta, or the like, it is desirable that as a third underlayer, an alloy layer of a nonmagnetic, hexagonal close-packed structure containing Co as a main component be formed immediately below the magnetic layers. A favorable epitaxial growth is promoted by forming the third underlayer.

Further, a layer having a higher saturation magnetic flux density (Bs) than that of the upper magnetic layers can also be formed between the upper magnetic layers and Ru intermediate layers. In this case, it is desirable because the exchange coupling field is increased between the upper magnetic layers and the lower magnetic layers. Pure Co, CoCr alloy, CoCrPt alloy, CoCrPtB alloy, or the like can be used for the above Bs layers (referred to below as a coupling enhancement layer). The larger Bs of the coupling enhancement layers, the more intense the exchange coupling field. Simultaneously, noise of a medium is increased, and so it is necessary to control Bs to a moderate value.

A further benefit is attained by realizing a highly reliable magnetic storage device having a surface recording density of 50 megabits/mm$^2$ or more. The storage device uses the following medium as a magnetic recording medium and comprises a drive unit for driving the magnetic recording medium in a direction of recording, a composite type magnetic head having an electromagnetic induction type magnetic head for recording and a spin valve type magnetic head for reproducing, means for moving the composite type magnetic head relative to the magnetic recording medium, and recording/reproducing signal processing means for recording a signal input to the magnetic head and reproducing a signal output from the magnetic head.

DETAILED DESCRIPTION OF THE INVENTION

An explanation of the embodiments the invention is given below in detail with reference to the drawings.

First Embodiment

Figure 1:
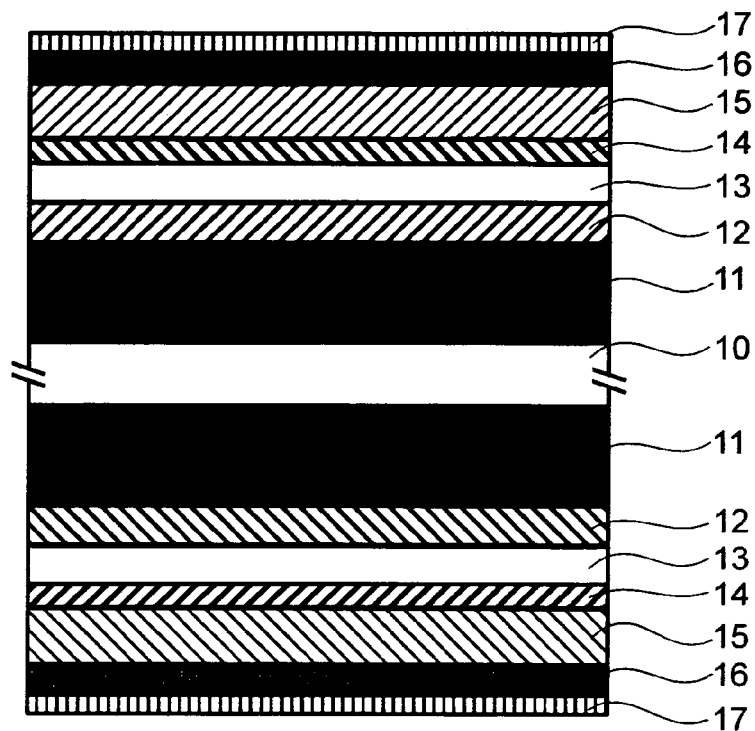
FIG. 1 is a schematic view showing a cross-sectional structure of an embodiment of a magnetic recording medium according to the invention.

FIG. 1 is a cross-sectional, structural drawing of an embodiment of a magnetic recording medium according to the invention. An aluminosilicate glass substrate 10 having a thickness of 0.635 mm and a diameter of 2.5 inches, and chemically strengthened surfaces, was alkali washed and dried. Then a Ni-40 atomic % Ta alloy having a thickness of 25 nm was formed as first underlayers 11 on both surfaces of the substrate.

Thereafter, the substrate was heated to about 280° C. by means of a lamp heater, and a Cr-20 atomic % Ti-3 atomic % B alloy having a thickness of 10 nm was formed thereon as second underlayers 12. Next, lower magnetic layers 13 formed of a Co—Cr—Pt alloy having a thickness of 2 to 4 nm, Ru intermediate layers 14 having a thickness of 0.6 nm, upper magnetic layers 15 formed of a Co-18 atomic % Cr-14 atomic % Pt-8 atomic % B alloy having a thickness of 16 nm were sequentially formed, and carbon films 16 having a thickness of 4 nm were formed as protective layers.

In this embodiment, Co-19 atomic % Cr-6 atomic % Pt, Co-16 atomic % Cr-8 atomic % Pt, Co-14 atomic % Cr-12 atomic % Pt, Co-14 atomic % Cr-10 atomic % Pt, Co-14 atomic % Cr-6 atomic % Pt, Co-14 atomic % Cr, Co-12 atomic % Cr-6 atomic % Pt, and Co-10 atomic % Cr-2 atomic % Pt alloys were used for the lower magnetic layers. After formation of the carbon films, the substrate was taken out of a sputtering device, and a lubricant containing perfluoro alkyl polyether as a main component was coated thereon to form lubricating layers 17 having a thickness of 18 nm.

Figure 2:
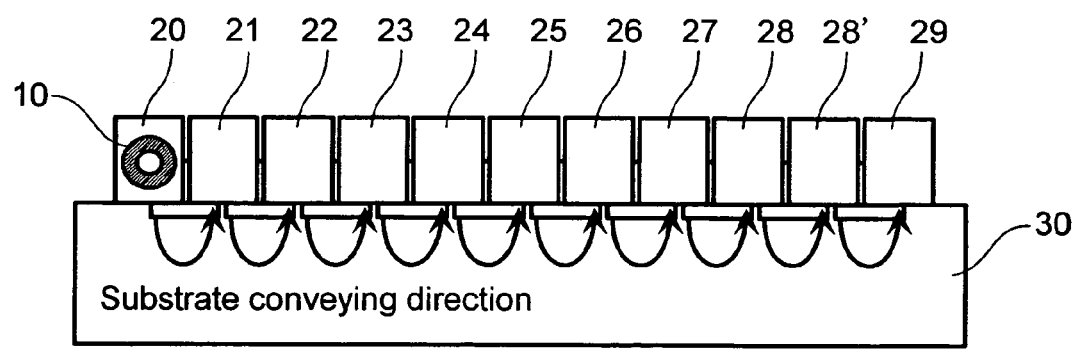
FIG. 2 is a schematic view showing the structure of a disk forming apparatus used in the invention.

The multilayer films were formed by means of a static sputtering device (MDP250B) manufactured by Intevac Company and shown in FIG. 2. In the sputtering device, degree of vacuum was $10 \times 10^{-5}$ to $12 \times 10^{-5}$ Pa and tact was 9 seconds. Formation of the layers from the first underlayers to the upper magnetic layers was performed in an Ar gas atmosphere of 0.93 Pa, and the carbon protective layers were formed in a mixed gas atmosphere, in which 10% nitrogen was added to Ar.

Figure 3:
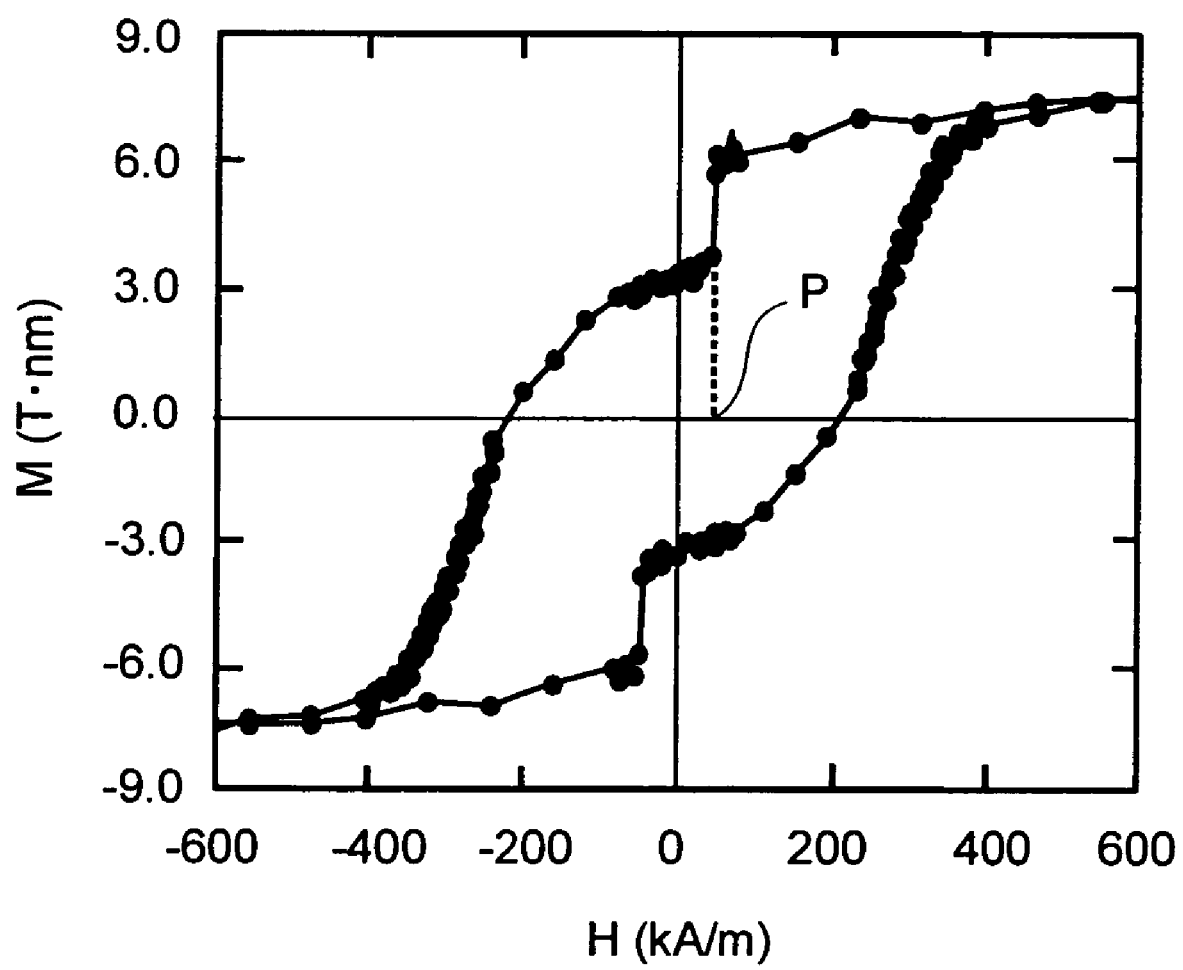
FIG. 3 shows hysteresis loops of a medium according to an embodiment of the invention.

Specimens of 8 mm$^2$ were cut from a medium thus fabricated, and magnetization curves were measured with a vibrating specimen magnetometer (VSM). VSM measurement was carried out at room temperature with application of a magnetic field of 796 kA/m at maximum in a circumferential direction of the medium. FIG. 3 shows magnetization curves of the medium, in which a Co-14 atomic % Cr alloy having a thickness of 3 nm was used for the lower magnetic layers. Difference in level representative of reversal of magnetization in the lower magnetic layers appears in the vicinity of 44 kA/m in applied magnetic field, which reveals that antiferromagnetic coupling acted between the upper magnetic layers and the lower magnetic layers. That magnetic field (P point in the figure), in which the difference in level was generated, was defined as an exchange coupling field Hx. It was shown in all the media according to the embodiment that the difference in level was found in a region with a magnetic field being plus (Hx>0) and the magnetic layers underwent antiferromagnetic coupling.

Figure 4:
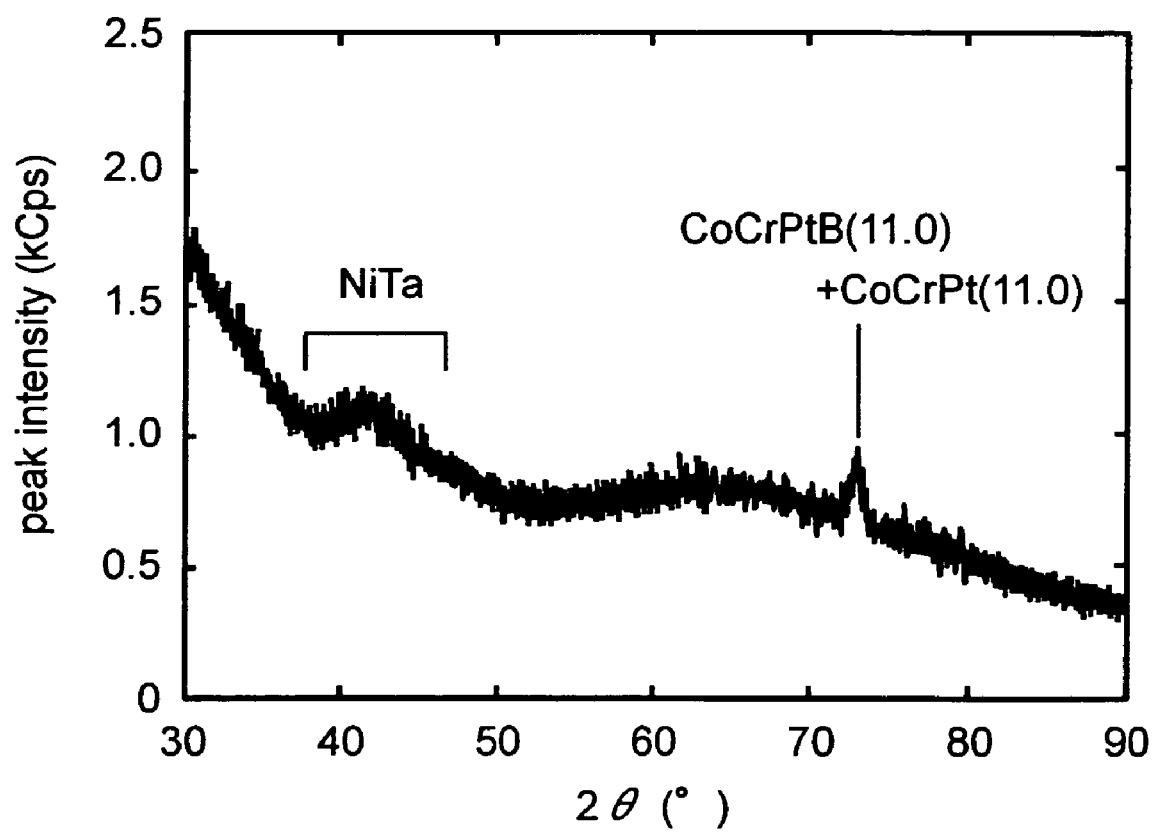
FIG. 4 shows an X-ray diffraction spectrum of a medium according to an embodiment of the invention.

FIG. 4 shows an X-ray diffraction profile of the above medium. The X-ray source was CuKα1 rays, which were made monochromatic by a monochromator. A diffraction peak from a (11.0) plane of the magnetic layers was found in the vicinity of 2θ=73°. This shows that the second underlayer, composed of CrTiB alloy, was oriented with a (100) plane substantially in parallel to the substrate surfaces and the magnetic layers underwent epitaxial growth on the underlayer. The reason why no diffraction peak from a (100) plane of the second underlayer was observed is that the underlayer had a narrow thickness of 10 nm. Also, a halo pattern was found in the vicinity of 2θ=40 to 43°. A similar pattern was also observed in monolayers, in which only the first underlayer was formed on the substrate. Therefore, it is believed that the halo pattern is a diffraction pattern from the first underlayer composed of a Ni-40 atomic % Ta alloy and the underlayer is of amorphous or microcrystal structure.

Table 1 indicates magnetic properties and recording characteristics when the lower magnetic layers were varied from 1.6 nm to 5 mn in film thickness. Here, the recording/reproducing characteristic was evaluated with the use of a composite head composed of a GMR head having a shield gap length (Gs) of 0.09 µm and a lead track width (Twr) of 0.33 µm, and a writing head having a gap length (GI) of 0.14 µm and a track width (Twr) of 0.45 µm. A maximum track recording density (HF) was set to 24.8 kFC/mm (630 kFCI) and 1F of the overwriting characteristic was set to a track recording density one sixth of the maximum track recording density. Normalized noise=Nd/So was defined using noise (Nd) and isolated read output (So) when recorded in HF, and the medium S/N was defined as a medium S/N=20 log (SMF/Nd) using a read output (SMF) at a track recording density (MF) of half the maximum track recording density.

The exchange coupling field Hx increased with a decrease in the film thickness (t1) of the magnetic layers independently of the composition of the lower magnetic layers. Hx could not be measured in a thin region of t1=2 to 3 nm or less because any difference in level was not clearly found in magnetization curves. Since Br·t decreased with a decrease in t1, however, it is believed that residual magnetization in the lower magnetic layers was in antiparallel to that of the upper magnetic layers in a thin region of t1=2 nm.

In regard to the media (specimen Nos. 105 to 107, 111 to 125), in which the content of Cr was from 10 atomic % to 16 atomic %, both the normalized noise and the medium S/N exhibited a high dependence on the film thickness (t1) of the lower magnetic layers and showed a minimum noise and a high S/N at t1=2 nm or t1=3 nm. In particular, a high medium S/N equal to or higher than 18.5 dB showed up in the media making use of Co-16 atomic % Cr-8 atomic % Pt, Co-14 atomic % Cr-10. atomic % Pt, Co-14 atomic % Cr-6 atomic % Pt, Co-14 atomic % Cr, and Co-12 atomic % Cr-6 atomic % Pt alloys having a thickness of 3 nm and a Co-10 atomic % Cr-2 atomic % Pt alloy having a thickness of 2 nm for the lower magnetic layers. In contrast, with the media (specimen Nos. 101 to 104), in which a Co-19 atomic % Cr-6 atomic % Pt alloy was used for the lower magnetic layers, both the normalized noise and the medium S/N exhibited no dependency on t1. In addition, the medium S/N was as low as 0.5 to 1 dB compared with the above media. In this way, it was found that a medium presenting a favorable S/N was obtained by using lower magnetic layers with a Cr content from 10 atomic % to 16 atomic %, and optimizing film thickness to about 3 nm. With the media (specimen Nos. 108 to 110) making use of lower magnetic layers containing Pt of 12 atomic %, the recording/reproducing characteristic exhibited a strong dependence on t1, but the overwriting characteristic (O/W) was bad and the medium S/N was low. As a result, it was found that the Pt content in the lower magnetic layers was preferably 10 atomic % or less. Furthermore, in comparison with the media (specimen Nos. 111 to 119) in which the Pt content was decreased from 10 atomic % to 0 atomic %, it was found that Pt had less influence on the recording/reproducing characteristic in media in which the Pt content was 10 atomic % or less.

Second Embodiment

Figure 5:
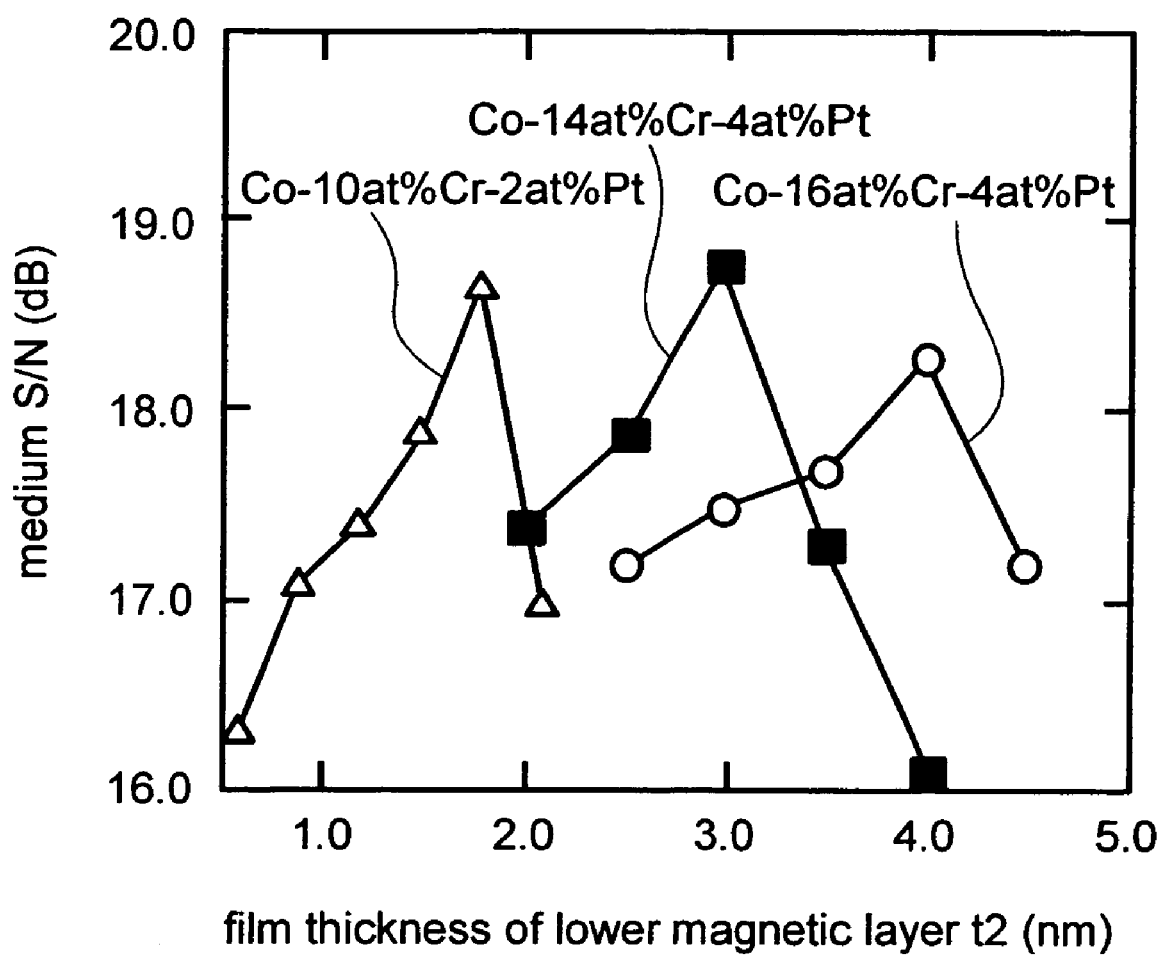
FIG. 5 is a graph showing dependence of a medium S/N of a medium according to an embodiment of the invention on a film thickness of lower magnetic layers

In a similar film structure to that of the first embodiment, a Ni-50 atomic % Nb alloy having a thickness of 40 nm was formed for first underlayer and a Cr-15 atomic % Ti-5 atomic % B alloy having a thickness of 8 nm was formed for second underlayer. Co-16 atomic % Cr-4 atomic % Pt, Co-14 atomic % Cr-8 atomic % Pt, Co-14 atomic % Cr-4 atomic % Pt, Co-12 atomic % Cr-4 atomic % Pt, and Co-10 atomic % Cr-2 atomic % Pt alloys having a thickness of 2 to 4 nm were used for the lower magnetic layers, and a Co-18 atomic % Cr-14 atomic % Pt-8 atomic % B alloy having a thickness of 18 nm or a Co-18 atomic % Cr-12 atomic % Pt-8 atomic % B alloy having a thickness of 18 nm was used for the upper magnetic layers. Table 2 indicates the magnetic properties of the media fabricated in the second embodiment and the recording characteristics evaluated with the use of the same magnetic head as that in the first embodiment. Here, specimen Nos. 201 to 226 indicate media in which a Co-18 atomic % Cr-14 atomic % Pt-8 atomic % B alloy was used for upper magnetic layers, and specimen Nos. 227 to 231 indicate media, in which a Co-18 atomic % Cr-12 atomic % Pt-8 atomic % B alloy was used for the magnetic layers. It is found that in both the media, Hx was 17 kA/m or more and antiferromagnetic coupling acted between the upper magnetic layers and the lower magnetic layers. With all the media, both the normalized noise and the medium S/N exhibited a strong dependence on t1, and a medium of 18.3 dB or higher was obtained by optimizing t1. FIG. 5 shows dependency of the medium S/N on t1 for the media (specimen Nos. 201 to 205, 211 to 215, 221 to 225), in which Co-16 atomic % Cr-4 atomic % Pt, Co-14 atomic % Cr-4 atomic % Pt, and Co-10 atomic % Cr-2 atomic % Pt alloys were used for lower magnetic layers. As described above, a strong dependency on t1 was found, and t1 when the medium S/N was extremely large shifted to a thick region with an increase in content of Cr. Further, as understood from comparing specimen Nos. 211-215 to Nos. 227-231, a film thickness of lower magnetic layers having a maximum value of the medium S/N shifted to 3.5 nm from 3.0 nm also in the case where a Co-18 atomic % Cr-14 atomic % Pt-8 atomic % B alloy changed to a Co-18 atomic % Cr-12 atomic % Pt-8 atomic % B alloy in the upper magnetic layers. As a result, it is known that the film thickness of lower magnetic layers having the maximum value of the medium S/N is dependent upon a material of the lower magnetic layers (in particular, the content of Cr) and a material of the upper magnetic layers.

Transmission electron microscopy (TEM observation) was performed on surfaces of the medium (specimen No. 213), in which a Co-14 atomic % Cr-4 atomic % Pt alloy having a thickness of 3 nm was used for the lower magnetic layers. An average particle size was estimated in the following procedure. First, areas of crystal grains were calculated by means of lattice images obtained at two million magnifications, and diameters of perfect circles having the same areas as the above areas were defined as particle sizes of the crystal grains. At this time, a region, in which identical fringe was continuous, was presumed to be one crystal grain, and crystal grains having a bi-crystal structure with c axes being perpendicular and adjacent to one another were presumed to be different crystal grains. Grain sizes were calculated for about 200 crystal grains, and an arithmetical mean thereof was assumed to be an average grain size. The average grain size thus obtained was 9.4 nm, which was a value suitable for realizing a surface recording density of 50 megabits/mm$^2$. It was also found that a value obtained by normalizing a standard deviation with the average grain size was 28% and grain size dispersion was uniform.

Further, the TEM observation was made on cross sections of magnetic layers of the medium (specimen No. 213). In the lattice images obtained, epitaxial growth occurred continuously from the lower magnetic layers to the upper magnetic layers, and the lower and upper magnetic layers could be differentiated due to a difference in contrast. The lower magnetic layers and upper magnetic layers, respectively, had film thicknesses of 3.08 nm and 17.8 nm, which were substantially set values. Film thicknesses of the lower magnetic layers can be found by measuring an element profile in the direction of film thickness with, for example, Auger spectroscopy, provided that composition of the layers is known. Or the film thickness may be found by means of fluorescence X-ray measurement, reflective X-ray measurement, or a combination thereof.

The following measure was used to evaluate thermal demagnetization of recording signals with respect to the media (specimen Nos. 213, 208) from the first embodiment, in which a Co-14 atomic % Cr-4 atomic % Pt alloy having a thickness of 3 nm and a Co-14 atomic % Cr-8 atomic % Pt alloy having a thickness of 3 nm were used. First, the media were placed in a high-temperature reservoir in an atmosphere of 65° C., and signals were recorded at the track recording density of 24.8 kFC/mm.

Intensity of the signals was measured until 1,000 seconds elapsed immediately after recording, and a decreasing rate of intensity of the signals during 1,000 seconds was measured. In addition, the same head as that used for evaluation of the recording characteristics was used as an evaluation head. The media, in which a Co-14 atomic % Cr-4 atomic % Pt alloy and a Co-14 atomic % Cr-8 atomic % Pt alloy were used for the lower magnetic layers, had a signal decay ratio of 12% and 0.8%, respectively. The decay ratio after the lapse of five years (up to $1.6 \times 10^8$ seconds) was estimated on the basis of these values to be 3.2% and 2.1%, respectively, and thus it was found that signal decay due to thermal fluctuation was sufficiently low. In addition, it was found that the medium in which the content of Pt in the lower magnetic layers was 8 atomic % had a lower decay ratio than the medium in which content of Pt was small, and thermal demagnetization could be suppressed by increasing the content of Pt. However, a Pt content equal to or less than 10 atomic % is desirable because the overwriting characteristic is degraded at a Pt content above 1.2 atomic %, as illustrated in the first embodiment, and a good medium S/N cannot be obtained.

Third Embodiment

Using the sputtering device shown in the first embodiment, a Ni-50 atomic % Al alloy having a thickness of 50 nm was formed as the first underlayer on a glass substrate, heated until the substrate temperature reached 220° C., and a second underlayer was formed. The second underlayer was a double-layered structure composed of Cr having a thickness of 5 nm and a Cr-10 atomic % W-7 atomic % B alloy having a thickness of 20 nm. This was intended for obtaining underlayers having a favorable crystallinity and composed of fine crystal grains by first forming a pure Cr layer without additives to form an initial growth layer involving fewer imperfections and forming a CrWB underlayer thereon. Further,a Co-36 atomic % Cr alloy having a thickness of 5 nm was formed as the third underlayer, and the lower magnetic layers were formed of alloys of Co-15 atomic % Cr, Co-14 atomic % Cr-5 atomic % B, Co-13.5 atomic % Cr-10 atomic % B, Co-12 atomic % Cr-4 atomic % Pt-6 atomic % B, Co-14 atomic % Cr-5 atomic % Ru, Co-14 atomic % Cr-5 atomic % Ru-3 atomic % B, Co-13 atomic % Cr-8 atomic % Re, Co-13 atomic % Cr-8 atomic % Re-4 atomic % B, and Co-13 atomic % Cr-12 atomic % B. Upper magnetic layers composed of a Co-16 atomic % Cr-10 atomic % Pt-6 atomic % B-2 atomic % Cu alloy having a thickness of 16 nm, and carbon protective layers were sequentially formed through Ru intermediate layers having a thickness of 0.9 nm, and a lubricant was coated thereon.

An X-ray diffraction measurement revealed that the magnetic layers in the media according to the embodiment were mainly orientated with a (10.0) plane being substantially in parallel to the surface of the substrate. The medium S/N in all the media exhibited a strong dependence on t1, and assumed a maximum value at t1=2.7 to 3.6 nm. Table 3 indicates magnetic properties, thermal stability factors (Ku·v/kT), and the medium S/N of the media, for which a maximum medium S/N was obtained. Here, Ku·v/kT (Ku: constant of crystalline magnetic anisotropy, v: volume of magnetic crystal grains, k: Boltzmann's constant, T: absolute temperature) was found by fitting a time dependence of remanent coercive force from 7.5 seconds to 240 seconds at room temperature to the Sharrock's formula as indicated in, for example, *J. Magn. Mater.* 127, page 233 (1993). The medium S/N was evaluated by using a head of Twr=0.30 μm and Tww=0.42 μm and setting a maximum track recording density (HF) to 26.2 KFC/mm. It was found that the exchange coupling field was 50 kA/m or more for all the media, and the upper magnetic lower magnetic layers were magnetized in antiparallel in a state of residual magnetization. Investigation conducted by the inventors determined that signal decay due to thermal fluctuation could be suppressed and no problem in reliability arose provided that Ku·v/kT found by means of such measure was 80 to 90 or higher. In addition, the medium S/N assumed a favorable value of 18 dB or higher, and a particularly favorable medium S/N was obtained when lower magnetic layers containing B were used. Thus, it has been clarified that the medium S/N can be further improved by adding B to the lower magnetic layers. With the medium (specimen No. 309), which was fabricated as a comparative example and in which a Co-14 atomic % Cr-12 atomic % B alloy was used for lower magnetic layers, it was found that the medium S/N was exceedingly low and addition of B of 10 atomic % or less was desirable. As formedia (specimen Nos. 305, 306), in which Ru was added to the lower magnetic layers, the exchange coupling field was particularly high—70 kA/m or higher. With the media in which Re was added to the lower magnetic layers, the film thickness of the magnetic layers can be measured with high accuracy by measuring the characteristic X-ray intensity of Re with fluorescence X-rays. Therefore, it is preferable because control of film thickness is made easy in mass-producing processes.

Fourth Embodiment

After a substrate, in which Al—Mg alloy surfaces coated with a NiP plating film were subjected to texture processing, was heated to 250° C., the underlayer made up of Cr having a thickness of 5 nm, the underlayer made up of Cr-10 atomic % Ti-10 atomic % Mo-3 atomic % B having a thickness of 20 nm, and the underlayer made up of Co-40 atomic % Ru having a thickness of 3 nm were formed. Then lower magnetic layers having a thickness of 2.0 nm to 4.0 nm were formed, and an alloy of Co-18 atomic % Cr-14 atomic % Pt-6 atomic % B-2 atomic % Cu having a thickness of 16.5 nm was formed as upper magnetic layers with Ru intermediate layers therebetween. To increase the exchange coupling field, layers of Co-5 atomic % Cr having a thickness of 0.6 nm were formed as a coupling enhancement layer between the upper magnetic layers and the Ru intermediate layers.

Figure 6:
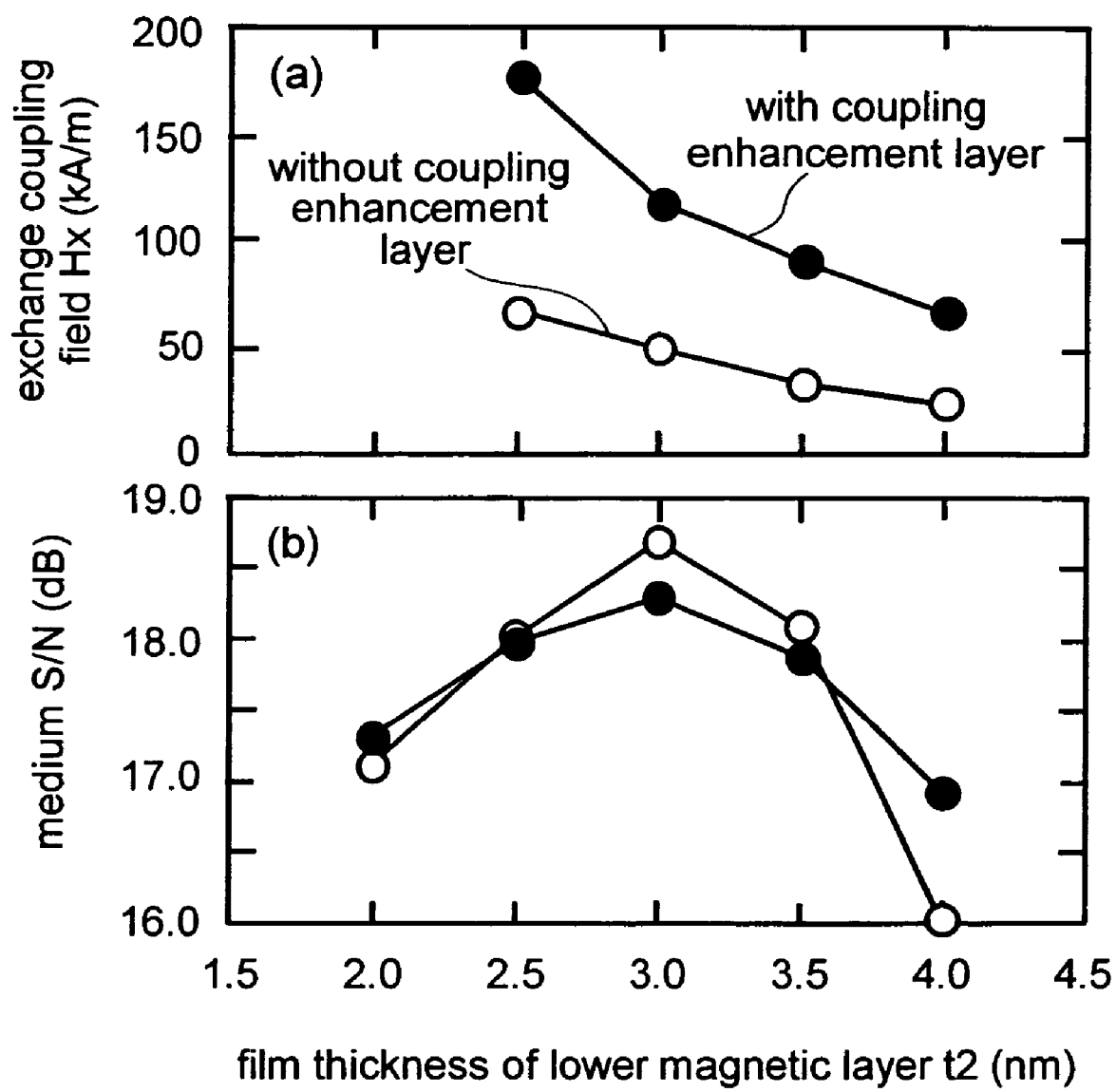
FIGS. 6A and 6B are graphs showing an exchange coupling field of a medium according to an embodiment of the invention and dependence of a medium S/N on a film thickness of lower magnetic layers.

A monolayer of a Co-5 atomic % Cr alloy having a thickness of 16 nm was formed and its saturation magnetic flux density (Bs) was 1.35 T two times or more Bs (0.52 T) of the upper magnetic layers in the measurement by VSM. FIGS. 6A and 6B show exchange coupling fields Hx and dependence of the medium S/N on a film thickness (t1) of the lower magnetic layers evaluated by the same measure as that in the first embodiment. It was found that by forming the coupling enhancement layer (CoCr layer), Hx was improved two times or more independently of t1 and formation of the coupling enhancement layer was exceedingly effective in improving Hx. Even in the case where the coupling enhancement layers were formed, the medium S/N showed a strong dependence on t1 and a high medium S/N was obtained by optimizing t1. When the medium S/N rose to maximum, t1 was 3.0 nm like the case with no coupling enhancement layers. Introduction of the coupling enhancement layers caused the maximum value of the medium S/N to decrease somewhat to 18.3 dB from 18.7 dB, but dependence of the medium S/N on t1 could be reduced. Thereby, dispersion of the medium S/N caused by dispersion of t1 can be reduced and more stable mass-producing processes become possible.

Provided that Bs is larger than the upper magnetic layers, pure Co, CoCrPt alloy, CoCrPtB alloy, CoRu alloy, or the like, as well as CoCr alloy may be used for the coupling enhancement layers.

Fifth Embodiment

The embodiment has a similar layered structure to that in the first embodiment such that Cr-15 atomic % Ti-2 atomic % B, Cr-10 atomic % Ti-7 atomic % B, and Cr-7.5 atomic % Ti-12 atomic % B alloys each having a thickness of 10 nm were used for the second underlayer, and a Co-14 atomic % Cr-6 atomic % Pt alloy having a thickness of 2 to 4 nm was used for lower magnetic layers. Upper magnetic layers had a thickness of 18 nm. In addition, a medium, in which Cr-15 atomic % Ti and Cr-5 atomic % Ti-15 atomic % B alloys each having a thickness of 10 nm were used for the second underlayer, was fabricated as a comparative example.

In all the media according to the embodiment, Hx was more than 25 kA/m and the upper and lower magnetic layers were anti-ferromagnetically coupled (Table 4). A strong dependence of the lower magnetic layers on t1 and t1=3 nm provided a medium having a high S/N of 18 dB or higher. Media of comparative examples (specimen Nos. 516 to 518), in which an underlayer made up of Cr-15 atomic % Ti containing no B was used, exhibited no dependence on t1 and were low in medium S/N. Media of comparative examples (specimen Nos. 519 to 521), in which an underlayer made up of Cr-5 atomic % Ti-15 atomic % B was used, exhibited a favorable medium S/N but it was found that the media were low in Ku·v/kT and insufficient in stability for thermal fluctuation. As a result, it was clarified that concentration of B added to the underlayer was preferably at least 2 atomic % and at most 12 atomic %.

Sixth Embodiment

Figure 7:
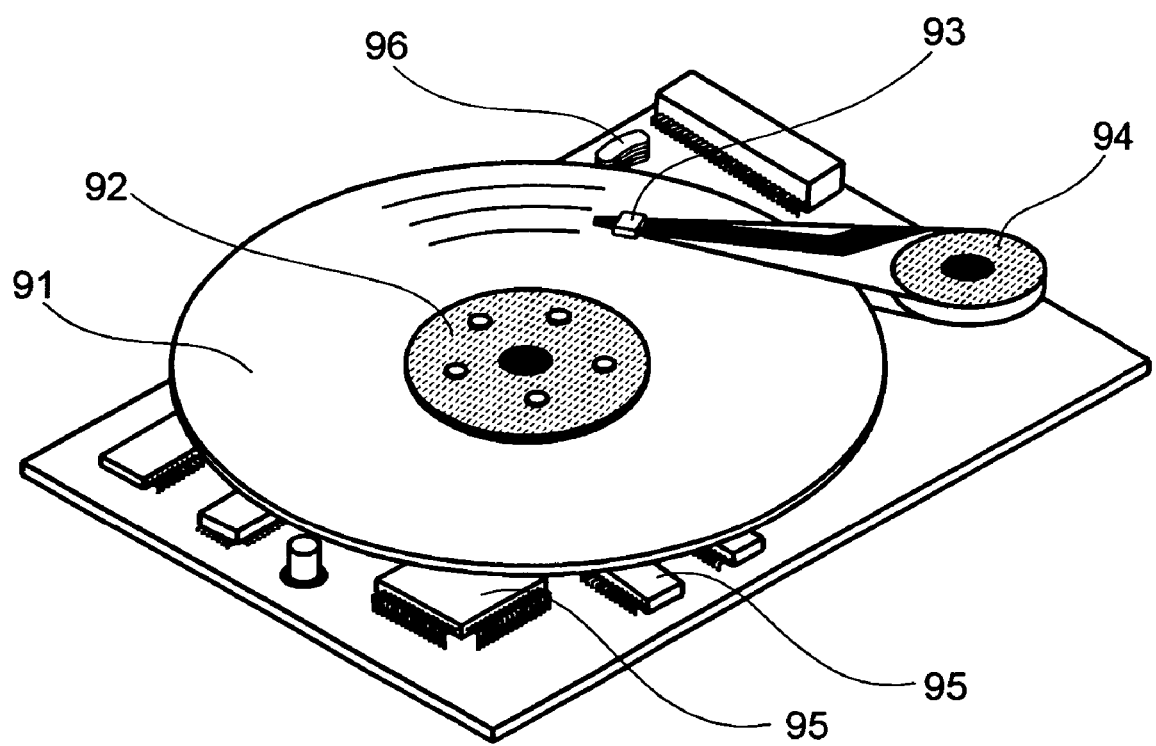
FIG. 7 is a perspective view showing a constructional example of a magnetic storage device according to the invention.

As shown in FIG. 7, a magnetic storage device was constructed comprising a magnetic recording medium 91, a drive 92 for driving the medium, a magnetic head 93 composed of a recording unit and a reproducing unit, means 94 for moving the magnetic head relative to the magnetic recording medium, means for inputting a signal into the magnetic head, recording/reproducing signal processing means 95 for reproducing a signal output from the magnetic head, and a mechanism 96 withdrawing at the time of unloading.

Figure 8:
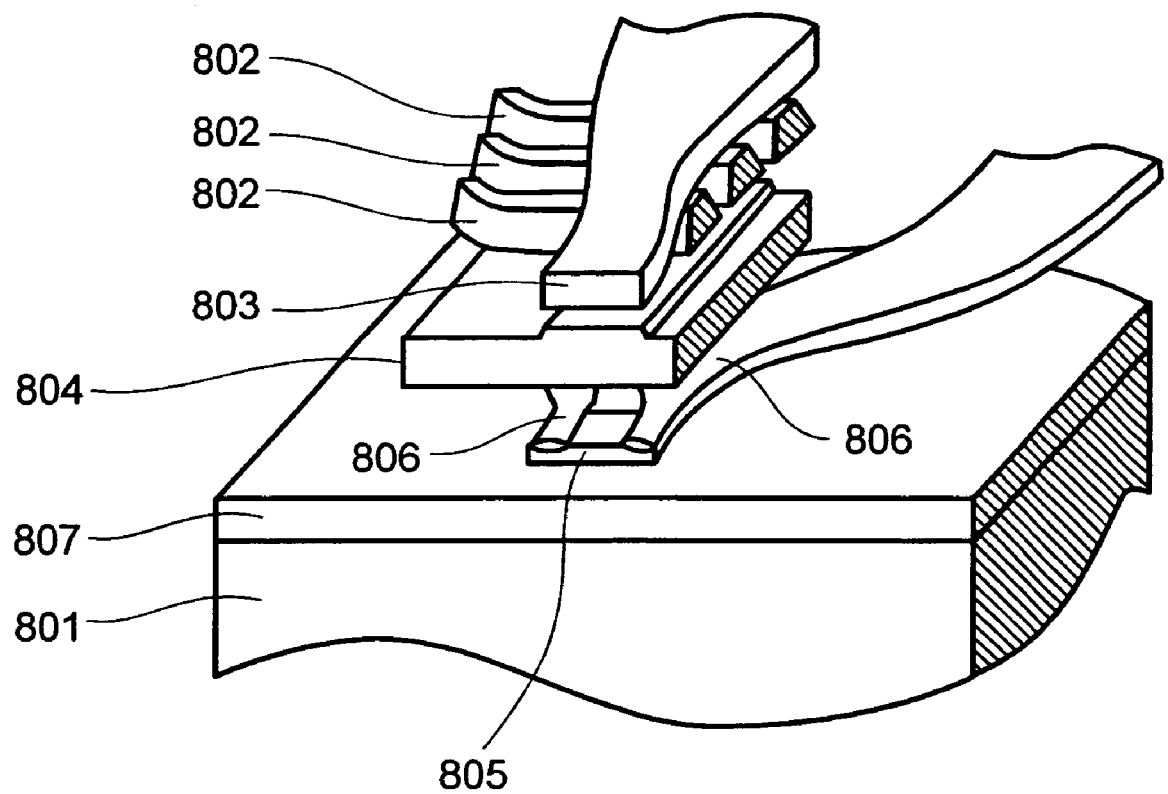
FIG. 8 is a perspective view showing an example of a construction of a magnetic head in the magnetic storage device according to the invention.

The reproducing unit of the magnetic head 93 was composed of a magnetoresistance effect type magnetic head. FIG. 8 is a schematic, perspective view showing the construction of the magnetic head. The head was a composite type head having a combination electromagnetic induction type head for recording, formed on a substrate 801, and a magnetoresistance-effect type head for reproducing. The recording head was composed of an upper recording magnetic pole 803 and a lower recording magnetic pole/upper shield layer 804 with a coil 802 interposed therebetween, and a gap extending the length between the magnetic poles was 0.14 μm. Copper having a thickness of 15 μm was used for the coil 802. The reproducing head was composed of a magnetic resistance sensor 805 and electrode patterns 806 on both ends thereof, the magnetic resistance sensor 805 being interposed between the lower recording magnetic pole/upper shield layer 804 and a lower shield layer 807, and a distance between the two shield layers being 0.10 μm. A gap layer between the recording magnetic poles and a gap layer between the shield layers and the magnetic resistance sensor are omitted from the figure.

Figure 9:
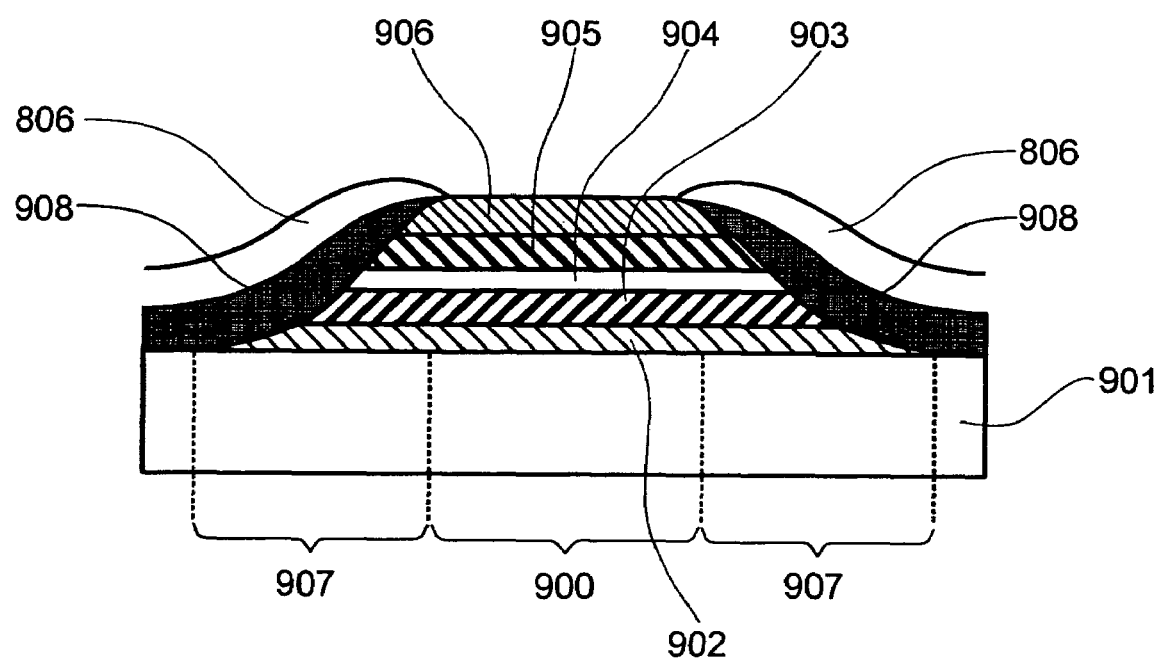
FIG. 9 is a schematic view showing a cross-sectional structure of a magnetic resistance sensor on a magnetic head in the magnetic storage device according to the invention.

FIG. 9 shows a cross-sectional structure of the magnetic resistance sensor 805. A signal detecting region 900 of the magnetic sensor is composed of a plurality of electrically conductive and magnetic layers, magnetizing directions of which are relatively varied by external magnetic fields to thereby produce a large change in resistance, and magnetic resistance sensors (spin valve type regenerative elements) disposed between the electrically conductive and magnetic layers and including electrically conductive and nomnagnetic layers. The magnetic sensor is of a structure, in which a Ta buffer layer 902, a lower magnetic layer 903, an intermediate layer 904 formed from copper, an upper magnetic layer 905, and an antiferromagnetic layer 906 formed from Pt—Mn alloy were sequentially formed on a gap layer 901. A Ni-20 atomic % Fe alloy was used for the lower magnetic layer 903, and cobalt was used for the upper magnetic layer 905. Magnetization of the upper magnetic layer 905 was fixed in one direction by an exchange magnetic field from the antiferromagnetic layer 906. In contrast, since a magnetizing direction of the lower magnetic layer 903 in contact with the upper magnetic layer 905 through the nonmagnetic layer 904 was varied by leakage magnetic field from the magnetic recording medium, resistance was changed. Tapered portions 907 were provided on both ends of the signal detecting region 900. The tapered portions 907 were composed of a permanent magnet layer 908 serving to make the lower magnetic layer 903 a single-domain, and a pair of electrodes 806 for taking out a signal formed on the layer. A Co—Cr—Pt alloy was used for permanent magnet layer 908, which must afford a large coercive force and must not be easily varied in a magnetizing direction.

The above magnetic storage device was constructed by selecting media of specimen Nos. 106, 112, 118, 202, 213, 228, 303, 306, 503, 508 and 513, and media in the fourth embodiment, in which the coupling magnetic field increasing layers of t1=3.0 nm were provided and not provided, among the magnetic recording media 91 described above in the first to sixth embodiments, and combining the selected media with the head shown above in FIG. 8. Even in the case of using all the above media, a recording density of 50 megabits/mm$^2$ or more was realized by the magnetic storage device thus constructed.

The present embodiment used a magnetic head comprising a magnetoresistance effect type magnetic head formed on a magnetic head slider having a flying surface rail area of 1.4 mm$^2$ or less and a mass of 2 mg or less. Reliability in shock resistance can be enhanced by making the area of the flying surface rail area of the slider equal to or less than 1.4 mm$^2$ and a mass equal to or less than 2 mg. Thereby, high recording density and high reliability in shock resistance can be made compatible with each other, and a mean time between failures (MTBF) of at least 300,000 hours with a recording density of 50 megabits/mm$^2$ or more can be realized.

The magnetic recording medium according to the invention effects improvement in the medium S/N while maintaining thermal stability. In addition, a magnetic storage device having a surface recording density of 50 megabits/mm$^2$ or more and a mean time between failures of at least 300,000 hours can be realized by using the magnetic recording medium according to the invention and a magnetoresistance effect type head.

TABLE 1

| number of specimen | material of lower magnetic layers | t1 (nm) | Hx (kA/m) | Br · t (T · nm) | O/W (dB) | normalized noise (uVpp/uVrms) | medium S/N (dB) |
|---|---|---|---|---|---|---|---|
| 101 | Co-19 at % Cr-6 at % Pt | 5.0 | 54 | 3.2 | 41 | 0.0311 | 18.1 |
| 102 | Co-19 at % Cr-6 at % Pt | 4.0 | 74 | 3.7 | 40 | 0.0309 | 18.1 |
| 103 | Co-19 at % Cr-6 at % Pt | 3.0 | — | 4.3 | 40 | 0.0300 | 17.8 |
| 104 | Co-19 at % Cr-6 at % Pt | 2.0 | — | 4.5 | 40 | 0.0299 | 18.0 |
| 105 | Co-16 at % Cr-8 at % Pt | 4.0 | 32 | 3.1 | 42 | 0.0622 | 12.2 |
| 106 | Co-16 at % Cr-8 at % Pt | 3.0 | 60 | 3.7 | 41 | 0.0276 | 18.5 |
| 107 | Co-16 at % Cr-8 at % Pt | 2.0 | — | 4.4 | 41 | 0.0298 | 17.8 |
| 108 | Co-14 at % Cr-12 at % Pt | 4.0 | 5 | 2.7 | 39 | 0.0366 | 15.7 |
| 109 | Co-14 at % Cr-12 at % Pt | 3.0 | 12 | 3.6 | 35 | 0.0265 | 17.7 |
| 110 | Co-14 at % Cr-12 at % Pt | 2.0 | — | 4.4 | 33 | 0.0288 | 16.9 |
| 111 | Co-14 at % Cr-10 at % Pt | 4.0 | 28 | 2.7 | 45 | 0.0392 | 16.1 |
| 112 | Co-14 at % Cr-10 at % Pt | 3.0 | 56 | 3.5 | 42 | 0.0268 | 19.1 |
| 113 | Co-14 at % Cr-10 at % Pt | 2.0 | — | 4.6 | 41 | 0.0289 | 17.9 |
| 114 | Co-14 at % Cr-6 at % Pt | 4.0 | 29 | 2.6 | 45 | 0.0458 | 15.0 |
| 115 | Co-14 at % Cr-6 at % Pt | 3.0 | 48 | 3.4 | 43 | 0.0264 | 19.2 |
| 116 | Co-14 at % Cr-6 at % Pt | 2.0 | — | 4.4 | 40 | 0.0292 | 17.9 |
| 117 | Co-14 at % Cr | 4.0 | 28 | 2.4 | 43 | 0.0523 | 14.1 |
| 118 | Co-14 at % Cr | 3.0 | 44 | 3.3 | 45 | 0.0253 | 19.5 |
| 119 | Co-14 at % Cr | 2.0 | 107 | 4.1 | 41 | 0.0302 | 17.7 |
| 120 | Co-12 at % Cr-6 at % Pt | 4.0 | 18 | 2.3 | 43 | 0.0283 | 18.6 |
| 121 | Co-12 at % Cr-6 at % Pt | 3.0 | 39 | 3.3 | 46 | 0.0275 | 18.8 |
| 122 | Co-12 at % Cr-6 at % Pt | 2.0 | — | 4.5 | 40 | 0.0293 | 17.9 |
| 123 | Co-10 at % Cr-2 at % Pt | 3.0 | 30 | 2.6 | 39 | 0.0889 | 11.0 |
| 124 | Co-10 at % Cr-2 at % Pt | 2.0 | 74 | 3.9 | 41 | 0.0269 | 18.6 |
| 125 | Co-10 at % Cr-2 at % Pt | 1.0 | — | 4.4 | 40 | 0.0331 | 17.6 |

TABLE 2

| number of specimen | material of lower magnetic layers | t1 (nm) | Hx (kA/m) | Br · t (T · nm) | O/W (dB) | normalized noise (uVpp/uVrms) | medium S/N (dB) |
|---|---|---|---|---|---|---|---|
| 201 | Co-16 at % Cr-4 at % Pt | 4.5 | 38 | 3.8 | 43 | 0.0338 | 17.2 |
| 202 | Co-16 at % Cr-4 at % Pt | 4.0 | 48 | 4.2 | 41 | 0.0268 | 18.3 |
| 203 | Co-16 at % Cr-4 at % Pt | 3.5 | 62 | 4.5 | 39 | 0.0289 | 17.7 |
| 204 | Co-16 at % Cr-4 at % Pt | 3.0 | −125 | 4.9 | 38 | 0.0289 | 17.5 |
| 205 | Co-16 at % Cr-4 at % Pt | 2.5 | −332 | 5.2 | 39 | 0.0294 | 17.2 |
| 206 | Co-14 at % Cr-8 at % Pt | 4.0 | 17 | 3.7 | 44 | 0.0363 | 16.1 |
| 207 | Co-14 at % Cr-8 at % Pt | 3.5 | 27 | 3.9 | 42 | 0.0309 | 17.3 |
| 208 | Co-14 at % Cr-8 at % Pt | 3.0 | 44 | 4.3 | 41 | 0.0258 | 18.8 |
| 209 | Co-14 at % Cr-8 at % Pt | 2.5 | 60 | 4.7 | 39 | 0.0281 | 17.9 |
| 210 | Co-14 at % Cr-8 at % Pt | 2.0 | 206 | 5.2 | 39 | 0.0291 | 17.4 |
| 211 | Co-14 at % Cr-4 at % Pt | 4.0 | 28 | 3.6 | 46 | 0.0359 | 16.2 |
| 212 | Co-14 at % Cr-4 at % Pt | 3.5 | 37 | 3.9 | 43 | 0.0383 | 18.2 |
| 213 | Co-14 at % Cr-4 at % Pt | 3.0 | 51 | 4.3 | 41 | 0.0260 | 18.7 |
| 214 | Co-14 at % Cr-4 at % Pt | 2.5 | 67 | 4.7 | 39 | 0.0279 | 17.8 |
| 215 | Co-14 at % Cr-4 at % Pt | 2.0 | −325 | 5.2 | 39 | 0.0295 | 17.4 |
| 216 | Co-12 at % Cr-4 at % Pt | 4.0 | 19 | 3.1 | 42 | 0.0571 | 12.7 |
| 217 | Co-12 at % Cr-4 at % Pt | 3.5 | 27 | 3.6 | 44 | 0.0419 | 15.1 |
| 218 | Co-12 at % Cr-4 at % Pt | 3.0 | 38 | 4.0 | 45 | 0.0295 | 18.0 |

TABLE 2-continued

| number of specimen | material of lower magnetic layers | t1 (nm) | Hx (kA/m) | Br · t (T · nm) | O/W (dB) | normalized noise (uVpp/uVrms) | medium S/N (dB) |
|---|---|---|---|---|---|---|---|
| 219 | Co-12 at % Cr-4 at % Pt | 2.5 | 53 | 4.4 | 40 | 0.0264 | 18.5 |
| 220 | Co-12 at % Cr-4 at % Pt | 2.0 | −118 | 5.1 | 39 | 0.0293 | 17.4 |
| 221 | Co-10 at % Cr-2 at % Pt | 2.1 | 36 | 3.9 | 47 | 0.0328 | 17.0 |
| 222 | Co-10 at % Cr-2 at % Pt | 1.8 | 48 | 4.3 | 43 | 0.0253 | 18.7 |
| 223 | Co-10 at % Cr-2 at % Pt | 1.5 | 73 | 4.8 | 40 | 0.0291 | 17.9 |
| 224 | Co-10 at % Cr-2 at % Pt | 1.2 | −303 | 5.3 | 39 | 0.0295 | 17.4 |
| 225 | Co-10 at % Cr-2 at % Pt | 0.9 | −66 | 5.3 | 40 | 0.0299 | 17.1 |
| 226 | Co-10 at % Cr-2 at % Pt | 0.6 | −283 | 5.2 | 42 | 0.0317 | 16.3 |
| 227 | Co-14 at % Cr-4 at % Pt | 4.0 | 35 | 4.3 | 43 | 0.0322 | 17.0 |
| 228 | Co-14 at % Cr-4 at % Pt | 3.5 | 43 | 4.6 | 44 | 0.0259 | 18.6 |
| 229 | Co-14 at % Cr-4 at % Pt | 3.0 | 61 | 5.1 | 41 | 0.0266 | 18.0 |
| 230 | Co-14 at % Cr-4 at % Pt | 2.5 | 79 | 5.5 | 40 | 0.0292 | 17.2 |
| 231 | Co-14 at % Cr-4 at % Pt | 2.0 | −100 | 6.0 | 40 | 0.0300 | 16.8 |

TABLE 3

| number of specimen | material of lower magnetic layers | t1 (nm) | Hx (kA/m) | Br · t (T · nm) | Ku · v/kT | medium S/N (dB) |
|---|---|---|---|---|---|---|
| 301 | Co-15 at % Cr | 3.6 | 51 | 3.8 | 90 | 18.1 |
| 302 | Co-14 at % Cr-5 at % B | 3.0 | 61 | 4.2 | 83 | 18.5 |
| 303 | Co-13.5 at % Cr-10 at % B | 3.3 | 65 | 3.9 | 81 | 18.7 |
| 304 | Co-12 at % Cr-4 at % Pt-6 at % B | 2.7 | 69 | 3.8 | 84 | 18.3 |
| 305 | Co-14 at % Cr-5 at % Ru | 3.0 | 73 | 4.2 | 86 | 18.0 |
| 306 | Co-14 at % Cr-5 at % Ru-3 at % B | 3.3 | 78 | 4.0 | 87 | 18.4 |
| 307 | Co-13 at % Cr-8 at % Re | 2.7 | 65 | 4.2 | 83 | 18.2 |
| 308 | Co-13 at % Cr-8 at % Re-4 at % B | 3.0 | 69 | 3.9 | 81 | 18.4 |
| 309 | Co-13 at % Cr-12 at % B | 3.3 | 75 | 4.3 | 76 | 17.4 |

TABLE 4

| number of specimen | material of lower magnetic layers | t1 (nm) | Hx (kA/m) | Br · t (T · nm) | Ku · v/kT | medium S/N (dB) |
|---|---|---|---|---|---|---|
| 501 | Co-15 at % Ti-2 at % B | 4.0 | 26 | 3.7 | 94 | 17.0 |
| 502 | Cr-15 at % Ti-2 at % B | 3.5 | 36 | 4.0 | 95 | 18.2 |
| 503 | Cr-15 at % Ti-2 at % B | 3.0 | 56 | 4.5 | 94 | 18.5 |
| 504 | Cr-15 at % Ti-2 at % B | 2.5 | 74 | 4.9 | 93 | 18.0 |
| 505 | Cr-15 at % Ti-2 at % B | 2.0 | — | 5.5 | 90 | 17.6 |
| 506 | Cr-10 at % Ti-7 at % B | 4.0 | 25 | 3.3 | 89 | 17.0 |
| 507 | Cr-10 at % Ti-7 at % B | 3.5 | 35 | 3.7 | 90 | 18.3 |
| 508 | Cr-10 at % Ti-7 at % B | 3.0 | 54 | 4.2 | 91 | 18.8 |
| 509 | Cr-10 at % Ti-7 at % B | 2.5 | 68 | 4.7 | 88 | 18.2 |
| 510 | Cr-10 at % Ti-7 at % B | 2.0 | — | 5.3 | 87 | 17.6 |
| 511 | Cr-7.5 at % Ti-12 at % B | 4.0 | 25 | 3.7 | 92 | 17.0 |
| 512 | Cr-7.5 at % Ti-12 at % B | 3.5 | 35 | 4.0 | 91 | 17.7 |
| 513 | Cr-7.5 at % Ti-12 at % B | 3.0 | 50 | 4.4 | 94 | 18.4 |
| 514 | Cr-7.5 at % Ti-12 at % B | 2.5 | 68 | 4.9 | 90 | 18.1 |
| 515 | Cr-7.5 at % Ti-12 at % B | 2.0 | — | 5.4 | 89 | 17.7 |
| 516 | Cr-15 at % Ti | 3.6 | 28 | 3.9 | 107 | 17.2 |
| 517 | Cr-15 at % Ti | 3.0 | 42 | 4.7 | 104 | 17.3 |
| 518 | Cr-15 at % Ti | 2.4 | 55 | 5.2 | 103 | 17.3 |
| 51 | Cr-5 at % Ti-15 at % B | 3.6 | 39 | 3.3 | 79 | 17.1 |
| 520 | Cr-5 at % Ti-15 at % B | 3.0 | 59 | 3.9 | 76 | 18.2 |
| 521 | Cr-5 at % Ti-15 at % B | 2.4 | 77 | 4.4 | 75 | 17.4 |

What is claimed is:

1. A magnetic recording medium comprising a non-magnetic substrate;

a plurality of underlayers disposed on the non-magnetic substrate;

a lower magnetic layer formed on an underlayer;

a non-magnetic intermediate layer disposed on the lower magnetic layer; and an upper magnetic layer containing Co as a main component disposed on the non-magnetic intermediate layer and coupled antiferromagnetically with the lower magnetic layer, wherein at least one of the underlayers contains Cr as a main component and between 2 atomic percent (at %) and 12 atomic percent (at %) of B, wherein the lower magnetic layer has Co as a main component, and contains between 10 atomic percent (at %) and 16 atomic percent (at %) of Cr and the quantity $C_1/t_1$ is between 3.6 and 6.2 where $C_l$ is a atomic percent (at %) of Cr contained in the lower magnetic layer and $t_l$ is a film thickness of the lower magnetic layer expressed in nm.

2. A magnetic recording medium according to claim 1, wherein the lower magnetic layer further contains 10 atomic percent (at %) or less of Pt.

3. A magnetic recording medium according to claim 1, wherein at least one of the underlayers is composed of a Cr—Ti—B alloy.

4. A magnetic recording medium according to claim 1, further comprising an alloy layer having a higher saturation magnetization than that of the upper magnetic layer and containing Co as a main component, the alloy layer disposed between the upper magnetic layer and the non-magnetic intermediate layer.

5. A magnetic recording medium according to claim 1, wherein the upper magnetic layer further contains Cu.

* * * * *